(12) United States Patent
Bhatt et al.

(10) Patent No.: US 9,256,612 B1
(45) Date of Patent: Feb. 9, 2016

(54) SYSTEMS AND METHODS FOR MANAGING REFERENCES IN DEDUPLICATING DATA SYSTEMS

(71) Applicant: Symantec Corporation, Mountain View, CA (US)

(72) Inventors: Neel Bhatt, Roseville, MN (US); Stephan Gipp, St. Louis Park, MN (US)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 13/915,072

(22) Filed: Jun. 11, 2013

(51) Int. Cl.
  *G06F 17/30* (2006.01)
(52) U.S. Cl.
  CPC ............... *G06F 17/30156* (2013.01)
(58) Field of Classification Search
  CPC .................................... G06F 17/30159
  See application file for complete search history.

(56) References Cited

U.S. PATENT DOCUMENTS

| | | | |
|---|---|---|---|
| 7,567,188 B1 * | 7/2009 | Anglin et al. | 341/63 |
| 7,594,085 B1 | 9/2009 | Rao | |
| 8,041,907 B1 | 10/2011 | Wu et al. | |
| 8,108,446 B1 | 1/2012 | Christiaens | |
| 8,108,447 B2 | 1/2012 | Guo | |
| 8,224,874 B2 | 7/2012 | Guo et al. | |
| 8,224,875 B1 | 7/2012 | Christiaens et al. | |
| 8,307,176 B1 | 11/2012 | Wu et al. | |
| 8,327,097 B2 * | 12/2012 | Miyamoto et al. | 711/162 |
| 8,392,376 B2 | 3/2013 | Guo | |
| 8,504,529 B1 | 8/2013 | Zheng et al. | |
| 8,712,976 B1 * | 4/2014 | Chen et al. | 707/692 |
| 8,732,403 B1 | 5/2014 | Nayak | |
| 2007/0043734 A1 * | 2/2007 | Cannon et al. | 707/10 |
| 2009/0132619 A1 * | 5/2009 | Arakawa et al. | 707/205 |
| 2010/0250549 A1 * | 9/2010 | Muller et al. | 707/741 |
| 2011/0167096 A1 | 7/2011 | Guo et al. | |
| 2012/0036113 A1 | 2/2012 | Lillibridge et al. | |
| 2012/0159098 A1 * | 6/2012 | Cheung et al. | 711/162 |
| 2013/0036289 A1 | 2/2013 | Welnicki et al. | |
| 2013/0080403 A1 | 3/2013 | Yamakawa | |
| 2013/0110784 A1 | 5/2013 | Guo et al. | |
| 2013/0254402 A1 | 9/2013 | Vibhor et al. | |
| 2014/0025917 A1 | 1/2014 | Kaczmarczyk et al. | |

OTHER PUBLICATIONS

Xianbo Zhang, et al.; U.S. Appl. No. 13/646,852, filed Oct. 8, 2012.
Xianbo Zhang; U.S. Appl. No. 13/250,156, filed Sep. 30, 2011.

(Continued)

*Primary Examiner* — Khanh Pham
(74) *Attorney, Agent, or Firm* — ALG Intellectual Property, LLC

(57) ABSTRACT

A computer-implemented method for managing references in deduplicating data systems may include (1) identifying a first instance of a data segment stored within a deduplicating data system that reduces redundant data storage by storing at least two data objects such that each of the two data objects references the first instance of the data segment, (2) identifying an additional data object to be stored by the deduplicating data system that includes the data segment, (3) determining whether a reference limit associated with the first instance of the data segment has been reached, and (4) storing, based at least in part on determining that the reference limit associated with the first instance of the data segment has been reached, a second instance of the data segment within the deduplicating data system. Various other methods, systems, and computer-readable media are also disclosed.

20 Claims, 9 Drawing Sheets

(56) References Cited

OTHER PUBLICATIONS

"Data Domain Deduplication Storage Systems", http://www.emc.com/data-protection/data-domain/data-domain-deduplication-storage-systems.htm, as accessed Mar. 20, 2013, EMC Corporation, (on or before Mar. 20, 2013).

"Data Domain Protection Storage for Backup and Archive Data", http://www.emc.com/domains/datadomain/index.htm, as accessed Mar. 20, 2013, EMC Corporation, (Jul. 20, 2012).

"CommVault", http://www.commvault.com/, as accessed Mar. 20, 2013, (Dec. 2, 1998).

Fanglu Guo et al.; Systems and Methods for Increasing Restore Speeds of Backups Stored in Deduplicated Storage Systems; U.S. Appl. No. 13/889,191, filed May 7, 2013.

Deepak Patil et al; Systems and Methods for Preserving Deduplication Efforts After Backup-Job Failures; U.S. Appl. No. 13/917,761, filed Jun. 14, 2013.

\* cited by examiner

SYSTEMS AND METHODS FOR MANAGING REFERENCES IN DEDUPLICATING DATA SYSTEMS

BACKGROUND

Deduplicating data systems are often able to reduce the amount of storage space needed to store files by recognizing redundant data patterns. For example, a conventional deduplicating data system may reduce the amount of storage space needed to store similar files by dividing the files into data segments and storing only unique data segments. In this example, each deduplicated file stored within the deduplicating data system may be represented by a list of references to those data segments that make up the file.

While conventional deduplicating data systems may reduce the storage space required to store files, the mechanisms used by such conventional systems to manage deduplicated data may present unwanted limitations. For example, the storage space of a conventional deduplicating data system may become fragmented over time as a result of data segments becoming unreferenced and deleted at different rates. Moreover, because many files may reference the same data segments, many files stored within a deduplicating data system may become corrupt when certain data segments become corrupt. Accordingly, the instant disclosure addresses a need for additional and improved systems and methods for managing references in deduplicating data systems.

SUMMARY

As will be described in greater detail below, the instant disclosure generally relates to systems and methods for managing references in deduplicating data systems. In one example, a computer-implemented method for managing references in deduplicating data systems may include (1) identifying a first instance of a data segment stored within a deduplicating data system that reduces redundant data storage by storing at least two data objects such that each of the two data objects references the first instance of the data segment, (2) identifying an additional data object to be stored by the deduplicating data system that also includes the data segment, (3) determining whether a reference limit associated with the first instance of the data segment has been reached (e.g., a reference limit associated with the first instance of the data segment that limits the number of data objects within the deduplicating data system that may reference the first instance of the data segment), and (4) storing, based at least in part on determining that the reference limit associated with the first instance of the data segment has been reached, a second instance of the data segment within the deduplicating data system that is referenced by the additional data object.

In some examples, the reference limit associated with the first instance of the data segment may limit the number of data objects within the deduplicating data system that may reference the first instance of the data segment by limiting the amount of time during which the first instance of the data segment is available to be referenced.

In some examples, the reference limit associated with the first instance of the data segment may limit the number of data objects within the deduplicating data system that may reference the first instance of the data segment by limiting the number of times that the first instance of the data segment may be referenced.

In some examples, the step of storing the second instance of the data segment within the deduplicating data system may include storing the second instance of the data segment within a container within the deduplicating data system that is separate and distinct from the container within the deduplicating data system within which the first instance of the data segment is stored.

In some examples, the computer-implemented method for managing references in deduplicating data systems may further include (1) determining whether any data objects within the deduplicating data system reference the first instance of the data segment and (2) deleting the first instance of the data segment based at least in part on determining that no data objects within the deduplicating data system reference the first instance of the data segment.

In some examples, the computer-implemented method for managing references in deduplicating data systems may further include (1) detecting that the first instance of the data segment has become corrupt and (2) using the second instance of the data segment to repair the first instance of the data segment.

In some examples, the computer-implemented method for managing references in deduplicating data systems may further include (1) detecting that the second instance of the data segment has become corrupt and (2) using the first instance of the data segment to repair the second instance of the data segment.

In one embodiment, a system for implementing the above-described method may include (1) an identifying module that identifies a first instance of a data segment stored within a deduplicating data system that reduces redundant data storage by storing at least two data objects such that each of the two data objects references the first instance of the data segment and an additional data object to be stored by the deduplicating data system that includes the data segment, (2) a determining module that determines whether a reference limit associated with the first instance of the data segment has been reached (e.g., a reference limit associated with the first instance of the data segment that limits the number of data objects within the deduplicating data system that may reference the first instance of the data segment), (3) a storing module that stores, based at least in part on determining that the reference limit associated with the first instance of the data segment has been reached, a second instance of the data segment within the deduplicating data system that is referenced by the additional data object, and (4) at least one processor that executes the identifying module, the determining module, and the storing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a first instance of a data segment stored within a deduplicating data system that reduces redundant data storage by storing at least two data objects such that each of the two data objects references the first instance of the data segment, (2) identify an additional data object to be stored by the deduplicating data system that also includes the data segment, (3) determine whether a reference limit associated with the first instance of the data segment has been reached (e.g., a reference limit associated with the first instance of the data segment that limits the number of data objects within the deduplicating data system that may reference the first instance of the data segment), and (4) store, based at least in part on determining that the reference limit associated with the first instance of the data segment has been reached, a second instance of the data segment within the deduplicating data system that is referenced by the additional data object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
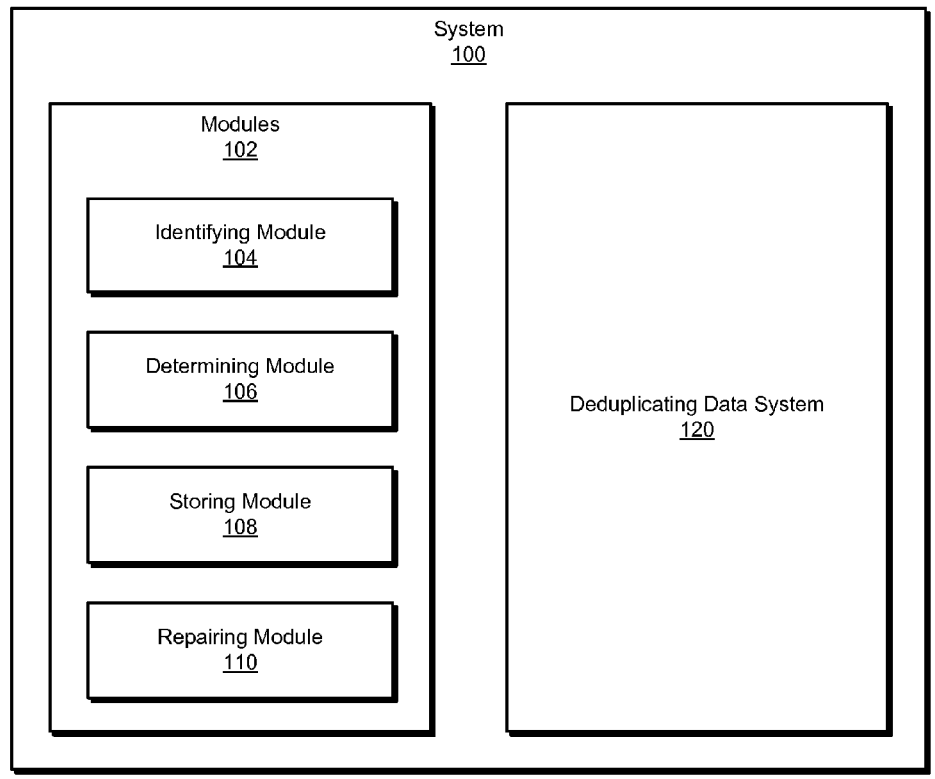
FIG. 1 is a block diagram of an exemplary system for managing references in deduplicating data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing references in deduplicating data systems. As will be explained in greater detail below, by limiting the number of data objects (e.g., files) that may reference individual data segments within deduplicating data systems, the systems and methods described herein may reduce or eliminate storage-space fragmentation and/or prevent data corruption within deduplicating data systems. Furthermore, in some examples, by reducing or eliminating storage-space fragmentation within deduplicating data systems, the systems and methods described herein may improve the read and/or write performance of deduplicating data systems. Embodiments of the instant disclosure may also provide various other advantages and features, as discussed in greater detail below.

Figure 2:
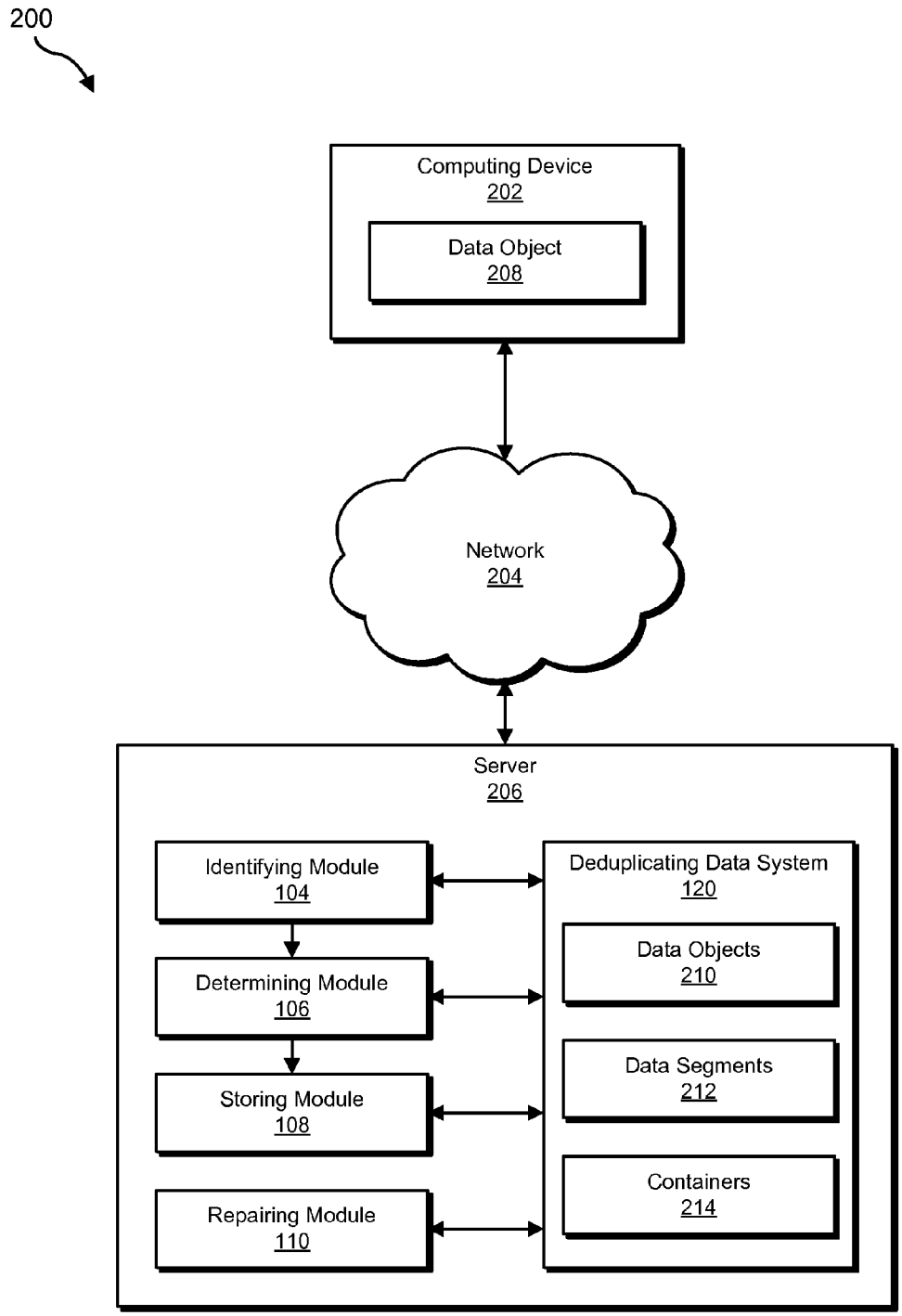
FIG. 2 is a block diagram of an exemplary system for managing references in deduplicating data systems.

The following will provide, with reference to FIGS. 1-2, detailed descriptions of exemplary systems for managing references in deduplicating data systems. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for managing references in deduplicating data systems. As illustrated in this figure, exemplary system 100 may include one or more modules 102 for performing one or more tasks. For example, and as will be explained in greater detail below, exemplary system 100 may include an identifying module 104 that identifies (1) a first instance of a data segment stored within a deduplicating data system that reduces redundant data storage by storing at least two data objects such that each of the two data objects references the first instance of the data segment and (2) an additional data object to be stored by the deduplicating data system that also includes the data segment. Exemplary system 100 may also include a determining module 106 that determines whether a reference limit associated with the first instance of the data segment has been reached.

In addition, and as will be described in greater detail below, exemplary system 100 may include a storing module 108 that stores, based at least in part on determining that the reference limit associated with the first instance of the data segment has been reached, a second instance of the data segment within the deduplicating data system that is referenced by the additional data object. Exemplary system 100 may also include a repairing module 110 that (1) detects that a first instance of the data segment has become corrupt and (2) uses a second instance of the data segment to repair the first instance of the data segment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include a deduplicating data system, such as deduplicating data system 120. Deduplicating data system 120 may represent any type or form of storage device and/or mechanism capable of deduplicating data (e.g., files) and/or storing deduplicated data. Deduplicating data system 120 may represent portions of a single storage system or computing device or a plurality of storage systems or computing devices. For example, deduplicating data system 120 may represent a portion of server 206 in FIG. 2, computing system 810 in FIG. 8, and/or portions of exemplary network architecture 900 in FIG. 9. Alternatively, deduplicating data system 120 in FIG. 1 may represent one or more physically separate devices capable of being accessed by a computing device, such as computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Server 206 may be programmed with one or more of modules 102. Additionally or alternatively, computing device 202 may be programmed with one or more of modules 102.

In one embodiment, one or more of modules 102 from FIG. 1 may, when executed by at least one processor of computing device 202 and/or server 206, facilitate computing device 202 and/or server 206 in managing references in deduplicating data systems. For example, and as will be described in greater detail below, one or more of modules 102 may cause computing device 202 and/or server 206 to (1) identify a first instance of a data segment (e.g., a first instance of one of data segments 212) stored within a deduplicating data system (e.g., deduplicating data system 120) that reduces redundant data storage by storing at least two data objects (e.g., two or more of data objects 210) such that each of the two data objects references the first instance of the data segment, (2) identify an additional data object (e.g., data object 208) to be stored by the deduplicating data system that also includes the data segment, (3) determine whether a reference limit associated with the first instance of the data segment has been reached (e.g., a reference limit associated with the first instance of the data segment that limits the number of data objects within the deduplicating data system that may reference the first instance of the data segment), (4) store, based at least in part on determining that the reference limit associated with the first instance of the data segment has been reached, a second instance of the data segment within the deduplicating data system that is referenced by the additional data object.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 810 in FIG. 8, or any other suitable computing device.

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may include deduplicating data system 120. In some examples, server 206 may be configured to use deduplicating data system 120 to reduce the storage space required to store data objects backed up from various client computing devices (e.g., computing device 202).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
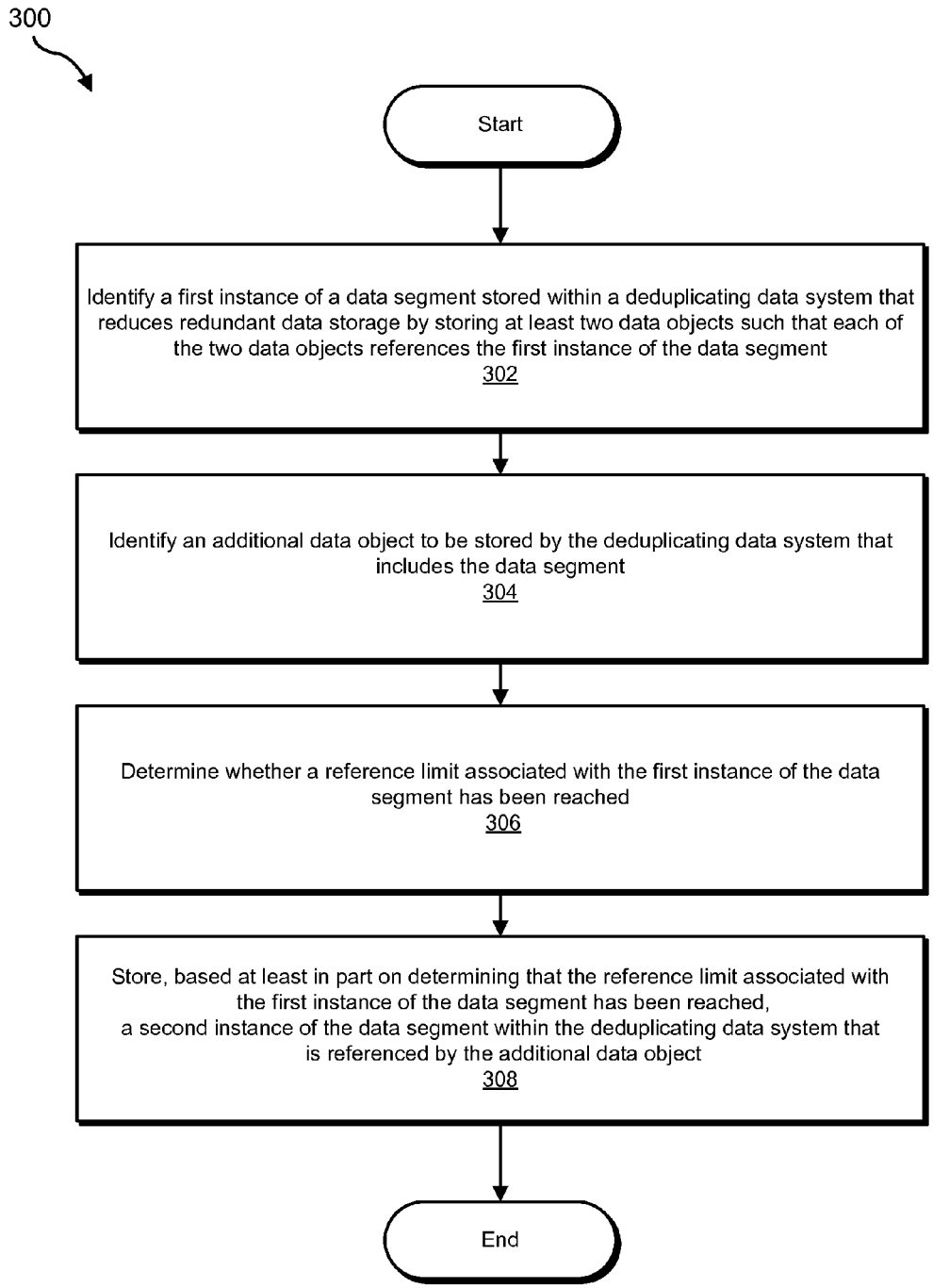
FIG. 3 is a flow diagram of an exemplary method for managing references in deduplicating data systems.
Figure 4:
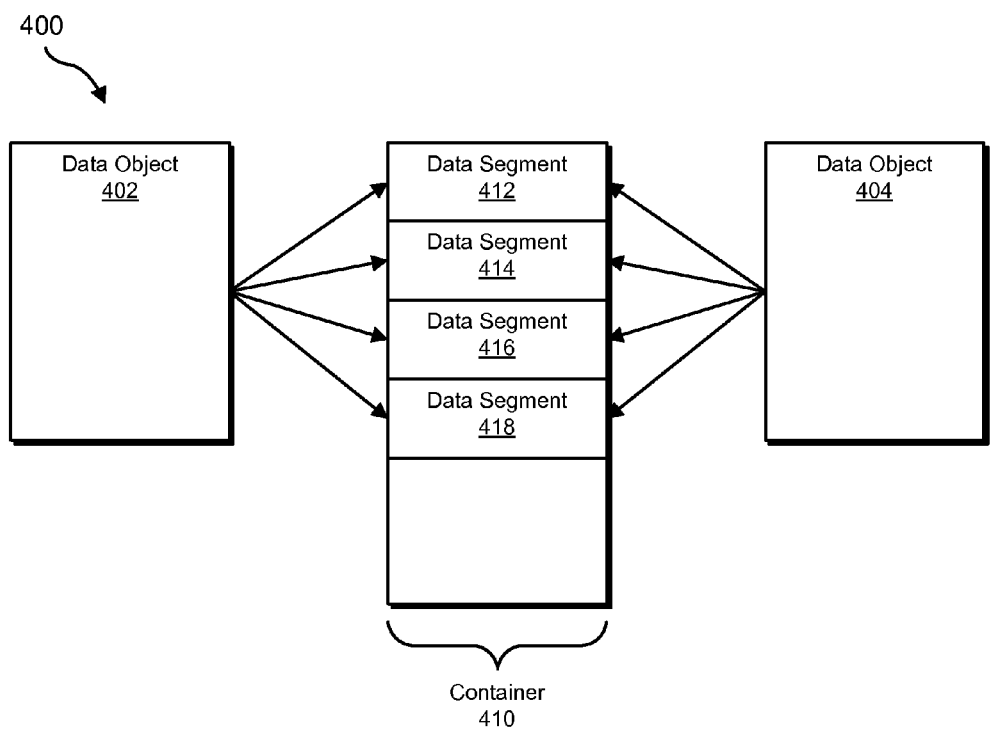
FIG. 4 is a block diagram of an exemplary deduplicating data system.
Figure 5:
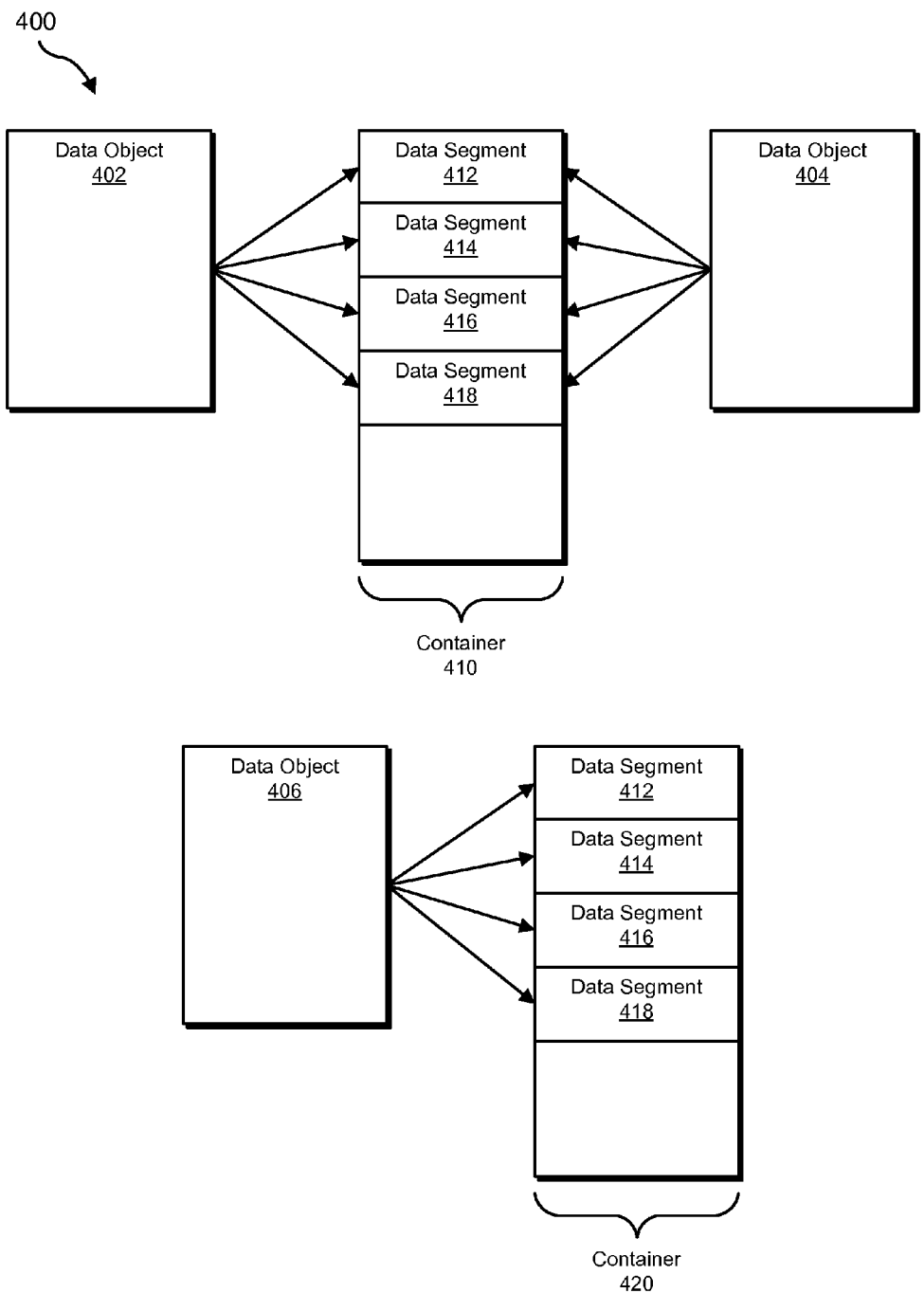
FIG. 5 is a block diagram of an exemplary deduplicating data system.

FIG. 3 is a flow diagram of an exemplary computer-implemented method 300 for managing references in deduplicating data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may identify a first instance of a data segment stored within a deduplicating data system that reduces redundant data storage by storing at least two data objects such that each of the two data objects references the first instance of the data segment. For example, at step 302 identifying module 104 may, as part of server 206 in FIG. 2, identify a first instance of a data segment stored within deduplicating data system 120. Using FIG. 4 as another example, identifying module 104 may identify data segment 412 stored within deduplicating data system 400 that reduces redundant data storage by storing data objects 402 and 404 such that each of data objects 402 and 404 references data segment 412.

The term "deduplicating data system," as used herein, generally refers to any type or form of storage device and/or mechanism capable of deduplicating data. Examples of deduplicating data systems may include, without limitation, SYMANTEC's NETBACKUP PUREDISK, NETBACKUP SURESCALE, and/or BACKUP EXEC, COMMVAULT's SIMPANA SOFTWARE, and/or EMC's DATA DOMAIN. In at least one example, the term "deduplicating data system" may refer to a single-instance storage system.

As used herein, the term "data object" may refer to any item of data that is capable of storage by a deduplicating data system. Examples of data objects may include, without limitation, images, files, and databases. In some examples, the phrase "data object" may refer to a list of references to one or more data segments.

Deduplicating data systems are often used to reduce the amount of storage space needed to store data objects (e.g., any collection of data suitable for deduplication, such as a file, a set of files, and/or a backup image). For example, backup systems may back up data objects to deduplicating data systems in order to reduce the amount of storage space required to back up the data objects.

Deduplicating data systems may reduce the amount of storage space needed to store similar data objects by dividing the data objects into data segments and by storing a single instance of at least one data segment for two or more data objects that contain the data segment. As used herein, the term "data segment" may refer to any unit of data that may be deduplicated. Examples of data segments include, without limitation, data blocks, data segments, file extents, portions of images, files, portions of data streams, and database entries. By dividing data objects into data segments and by storing a single instance of at least one data segment for two or more data objects that contain the data segment, a deduplicating data system may be able to store data objects as lists of references to the data segments that make up the data objects.

In some examples, a deduplicating data system may store data segments within containers. For example as illustrated in FIG. 2, deduplicating data system 120 may store data segments 212 within containers 214. Using FIG. 4 as another example, deduplicating data system 400 may store data segments 412, 414, 416, and 418 within container 410. As used herein, the term "container" may refer to any data structure, storage system, and/or location that stores, contains, includes, and/or points to a subset of data segments stored within a deduplicating data system. In some examples, containers may contain or tend to contain data segments from interrelated data objects. For example, if a deduplicating data system is used as part of a backup system, the deduplicating data system may store (or attempt to store, subject to other constraints) the data segments of all data objects associated with a given backup in the same container or set of containers.

In some cases, data objects stored within deduplicating data systems are kept for finite periods of time. For example, data objects that are backed up to a deduplicating data system may be associated with a retention period that indicates the length of time that the data objects should be kept. Once the retention period associated with a data object ends, the data object may be deleted from the deduplicating data system.

Because data objects may be stored within deduplicating data systems as lists of references to the data segments that make up the data objects and individual data segments may be referenced by many data objects, all or a portion of the data segments that are referenced by a data object may not be deleted when the data object itself is deleted. As a result, data segments may be deleted from deduplicating data systems at different rates. As will be explained in greater detail below, by limiting the number of data objects (e.g., files) that may reference individual data segments within deduplicating data systems, the systems and methods described herein may reduce or eliminate storage-space fragmentation within deduplicating data systems.

Returning to FIG. 3, the systems described herein may perform step 302 in any suitable manner. In one example, identifying module 104 may identify a first instance of a data segment stored within deduplicating data system 120 by reading a configuration file that identifies the first instance of the data segment (e.g., a configuration file of deduplicating data system 120 that identifies one or more of data segments 212). Additionally or alternatively, identifying module 104 may identify a first instance of a data segment stored within deduplicating data system 120 by identifying (e.g., intercepting, receiving, or retrieving) a message identifying the first instance of the data segment. In some contexts, identifying module 104 may be an extension and/or a component of deduplicating data system 120 and may identify a first instance of the data segment as part of managing data objects 210 and/or data segments 212. For example, identifying module 104 may, as part of deduplicating data system 120, identify a first instance of a data segment in response to receiving a request to store a data object that includes the data segment to deduplicating system 120.

At step 304, one or more of the systems described herein may identify an additional data object to be stored by the deduplicating data system that also includes the data segment. For example, at step 304 identifying module 104 may, as part of server 206 in FIG. 2, identify data object 208 that is to be stored by deduplicating data system 120 and that includes a data segment that is already stored by deduplicating data system 120. Using FIG. 5 as an additional example, identifying module 104 may identify data object 406 that is to be stored by deduplicating data system 400 and that includes data segments 412, 414, 416, and 418.

The systems described herein may perform step 304 in any suitable manner. In one example, identifying module 104 may identify an additional data object to be stored by deduplicating data system 120 by identifying (e.g., intercepting, receiving, or retrieving) a request to store the additional data object within deduplicating data system 120 and/or by determining that the additional data object is made up of at least one data segment that has already been stored within deduplicating data system 120.

At step 306, one or more of the systems described herein may determine whether a reference limit associated with the first instance of the data segment has been reached. For example, at step 306 determining module 106 may, as part of server 206 in FIG. 2, determine whether the reference limit associated with the data segment already stored by deduplicating data system 120 and that is included in the additional data object has been reached. Using FIG. 4 as an additional example, determining module 106 may determine whether the reference limits associated with data segments 412, 414, 416, and/or 418 and/or container 410 have been reached.

As used herein, the term "reference limit" may generally refer to any method for limiting the number of data objects within a deduplicating data system that may reference an instance of a data segment and/or a container within the deduplicating data system. In one example, the term "reference limit" may refer to a time based limit that limits the amount of time during which an instance of a data segment is available to be referenced, the amount of time during which instances of data segments stored within a container are available to be referenced, and/or the amount of time during which a container within which data segments are stored is available to be referenced. In another example, the term "reference limit" may refer to a reference based limit that limits the number of times that an instance of a data segment may be referenced by data objects stored within a deduplicating data system, the number of times that instances of data segments stored within a container may be referenced by data objects stored within a deduplicating data system, and/or the number of times that a container within which data segments are stored may be referenced by data objects stored within a deduplicating data system.

The systems described herein may perform step 306 in any suitable manner. For example, determining module 106 may determine that a time based reference limit associated with an instance of a data segment has been reached by determining that the amount of time that the instance of the data segment has been stored within the deduplicating data system and/or has been available to be referenced by data objects within the deduplicating data system is greater than the amount of time indicated by the reference limit associated with the instance of the data segment.

In another example, determining module 106 may determine that a reference based reference limit associated with an instance of a data segment has been reached by determining that the number of data objects that reference the instance of the data segment is equal to or greater than the number of references indicated by the reference limit associated with the instance of the data segment.

At step 308, one or more of the systems described herein may store, based at least in part on determining that the reference limit associated with the first instance of the data segment has been reached, a second instance of the data segment within the deduplicating data system that is referenced by the additional data object. For example, at step 308 storing module 108 may, as part of server 206 in FIG. 2, store a second instance of a data segment within deduplicating data system 120 that is referenced by the additional data object based at least in part on determining that the reference limit associated with the first instance of the data segment stored within deduplicating data system 120 has been reached. Using FIG. 5 as an additional example, storing module 108 may store, within deduplicating data system 400, a second instance of each of data segments 412, 414, 416, and 418 to container 420 that may be referenced by data object 406 based on determining that the reference limits associated with the instances of data segments 412, 414, 416, and 418 stored within container 410 have been reached.

The systems described herein may perform step 308 in any suitable manner. In one example, storing module 108 may store a second instance of a data segment within deduplicating data system 120 by copying a first instance of the data segment to a separate and distinct storage location within deduplicating data system 120. Using FIG. 5 as another example, storing module 108 may store a second instance of data segment 412 within deduplicating data system 400 by copying the instance of data segment 412 stored within container 410 to container 420.

In some examples, storing module 108 may ensure that the second instance of a data segment is stored within a container within deduplicating data system 120 that is separate and distinct from the container within deduplicating data system 120 within which the first instance of the data segment is stored. By storing a second instance of a data segment within a container that is separate and distinct from the container within which a first instance of the data segment is stored, storing module 108 may reduce the likelihood that both the first and second instance of the data segment will become simultaneously corrupt.

In some examples, storing module 108 may store a second instance of a data segment within deduplicating data system 120 by receiving the data segment from the source of the additional data object and by storing the data segment within deduplicating data system 120. Upon completion of step 308, exemplary method 300 in FIG. 3 may terminate.

Figure 6:
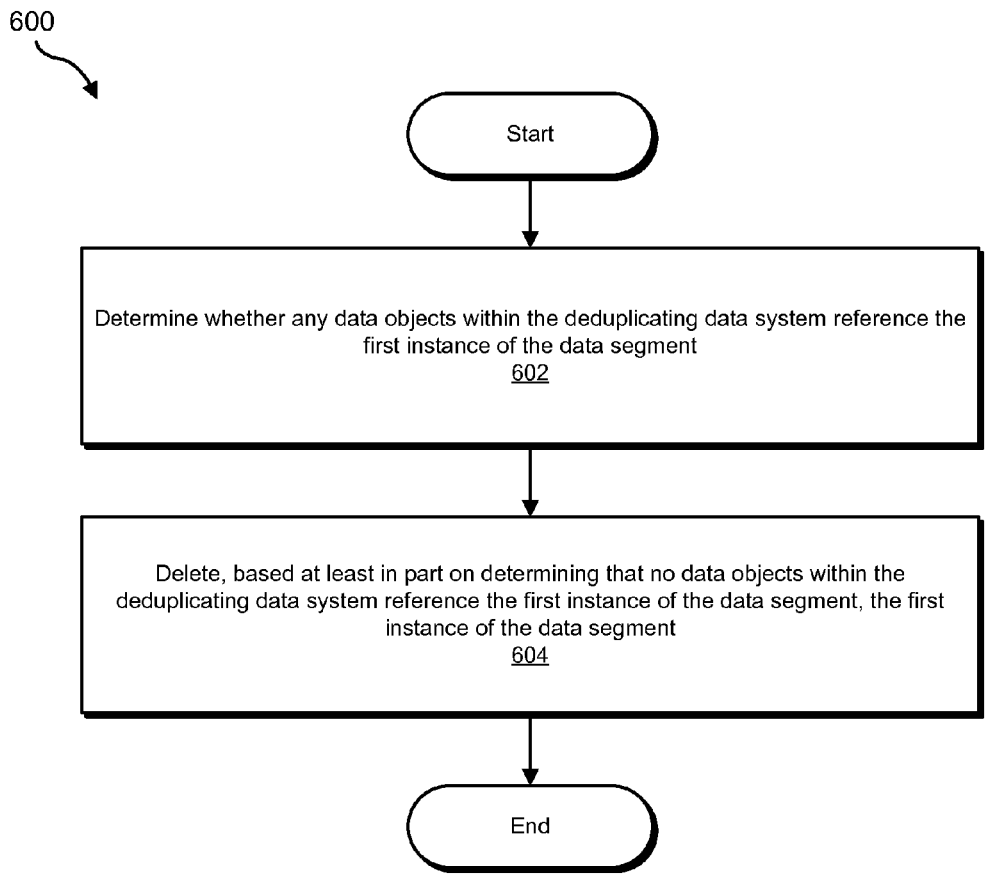
FIG. 6 is a flow diagram of an exemplary method for managing references in deduplicating data systems.

By reducing the number of data objects that may reference any one data segment within a deduplicating data system, the systems and methods described herein may allow the storage space within which data segments are stored to be freed more frequently. FIG. 6 is a flow diagram of an exemplary computer-implemented method 600 for managing references in deduplicating data systems. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 810 in FIG. 8, and/or portions of exemplary network architecture 900 in FIG. 9.

As illustrated in FIG. 6, at step 602, one or more of the systems described herein may determine whether any data objects within the deduplicating data system reference the first instance of the data segment. For example, at step 602 storing module 108 may, as part of server 206 in FIG. 2, determine whether any data objects within deduplicating data system 120 reference a first instance of one of data segments 212.

The systems described herein may perform step 602 in any suitable manner. In some examples, deduplicating data system 120 may maintain, for each instance of a data segment stored within data segments 212, a list that identifies each data object stored within data objects 210 that references the instance of the data segment, and storing module 108 may use these lists to determine whether any data objects within deduplicating data system 120 reference the first instance of the data segment.

In other examples, deduplicating data systems may track referenced and unreferenced data segments using reference counts. For example, deduplicating data system 120 may maintain for each instance of a data segment stored within deduplicating data system 120 a reference count that indicates how many data objects stored within deduplicating data system 120 reference the data segment. In this example, storing module 108 may determine whether any data objects within deduplicating data system 120 reference the first instance of the data segment using the reference count of the first instance of the data segment.

At step 604, one or more of the systems described herein may delete the first instance of the data segment based at least in part on determining that no data objects within the deduplicating data system reference the first instance of the data segment. For example, at step 604 storing module 108 may, as part of server 206 in FIG. 2, delete the first instance of the data segment based at least in part on determining that no data objects within deduplicating data system 120 reference the first instance of the data segment.

The systems described herein may perform step 604 in any suitable manner. For example, storing module 108 may delete the first instance of the data segment so that the storage space that contained the first instance of the data segment may be freed and used to store other data segments. Upon completion of step 604, exemplary method 600 in FIG. 6 may terminate.

Figure 7:
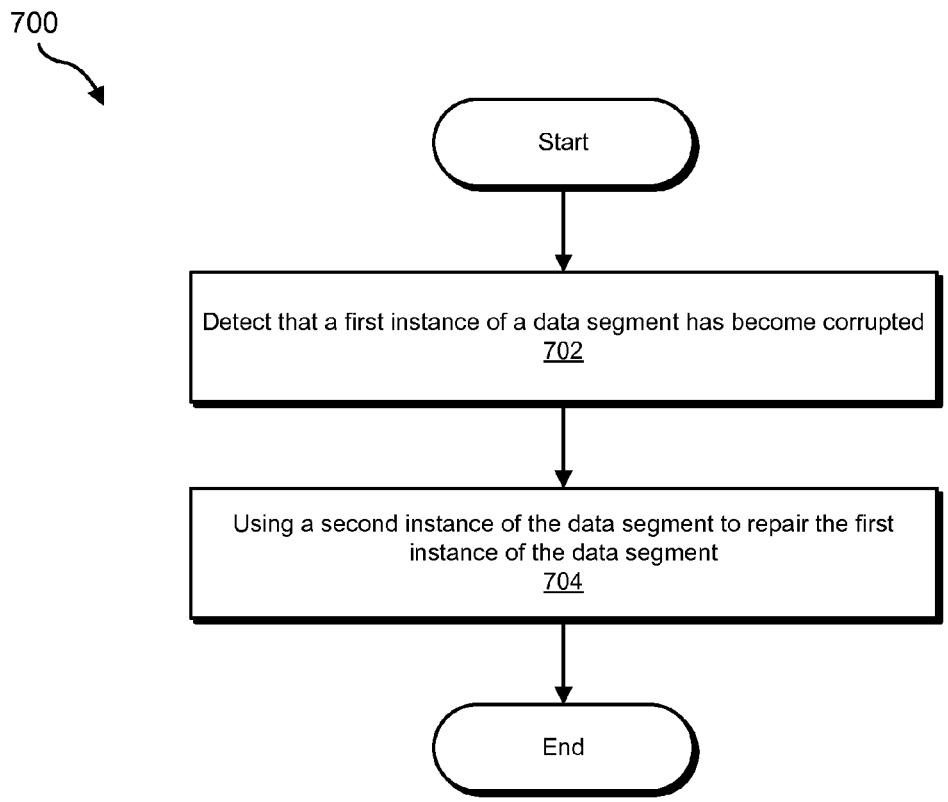
FIG. 7 is a flow diagram of an exemplary method for repairing corrupt data segments.

By reducing the number of data objects that may reference any one data segment within a deduplicating data system, the systems and methods described herein may also reduce the effects of data-segment corruption. Moreover, by storing multiple instances of certain data segments, the systems and methods described herein may use one instance of a data segment to repair another corrupt instance of the same data segment. As an example, FIG. 7 is a flow diagram of an exemplary computer-implemented method 700 for repairing corrupt data segments. The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, computing system 810 in FIG. 8, and/or portions of exemplary network architecture 900 in FIG. 9.

As illustrated in FIG. 7, at step 702 one or more of the systems described herein may detect that a first instance of a data segment has become corrupt. For example, at step 702 repairing module 110 may, as part of server 206 in FIG. 2, detect that a first instance of one or more of data segments 212 has become corrupt.

The systems described herein may perform step 702 in any suitable manner. In one example, repairing module 110 may detect that a first instance of a data segment has become corrupt by detecting that the storage space that contains the first instance of the data segment has become corrupt (e.g., from damage to and/or a partial failure of an underlying storage device). Using FIG. 5 as an example, repairing module 110 may detect that data segment 412 has become corrupt by detecting that container 410 has become corrupt. In another example, repairing module 110 may detect that a first instance of a data segment has become corrupt by periodically examining data segments for signs of data corruption.

At step 704, one or more of the systems described herein may use a second instance of the data segment to repair the first instance of the data segment. For example, at step 704 repairing module 110 may, as part of server 206 in FIG. 2, use a second instance of the data segment identified as part of step 702 to repair the first instance of the data segment.

The systems described herein may perform step 704 in any suitable manner. For example, repairing module 110 may create a copy of the second instance of the data segment and store the copy of the second instance of the data segment to the storage space allocated to store the first instance of the data segment. In another example, repairing module 110 may (1) identify any data objects that reference the first instance of the data segment and (2) adjust the references of these data objects so that they reference the second instance of the data segment instead of the first instance of the data segment.

Additionally and/or alternatively, repairing module 110 may (1) use the second instance of the data segment to store a third instance of the data segment to deduplicating data system 120, (2) identify any data objects that reference the first instance of the data segment, and (3) adjust the references of these data objects so that they reference the third instance of the data segment instead of the first instance of the data segment. Upon completion of step 704, exemplary method 700 in FIG. 7 may terminate.

As explained above, by limiting the number of data objects (e.g., files) that may reference individual data segments within deduplicating data systems, the systems and methods described herein may reduce or eliminate storage-space fragmentation and/or prevent data corruption within deduplicating data systems. Furthermore, in some examples, by reducing or eliminating storage-space fragmentation within deduplicating data systems, the systems and methods described herein may improve the read and/or write performance of deduplicating data systems.

For example, the systems and methods disclosed herein may age the data segments stored within a deduplicating data system and/or the containers within which they are stored so that after data segments and/or the containers have been used for deduplication for a particular amount of time and/or for a particular number of times, the data segments and/or containers may be considered aged-out and not available for further deduplication operations. By limiting the amount of time and/or the number of times that data segments may be used for deduplication, the systems and methods disclosed herein may ensure that data segments are referenced by a finite number of data objects and the storage space allocated to data segments is eventually freed.

Figure 8:
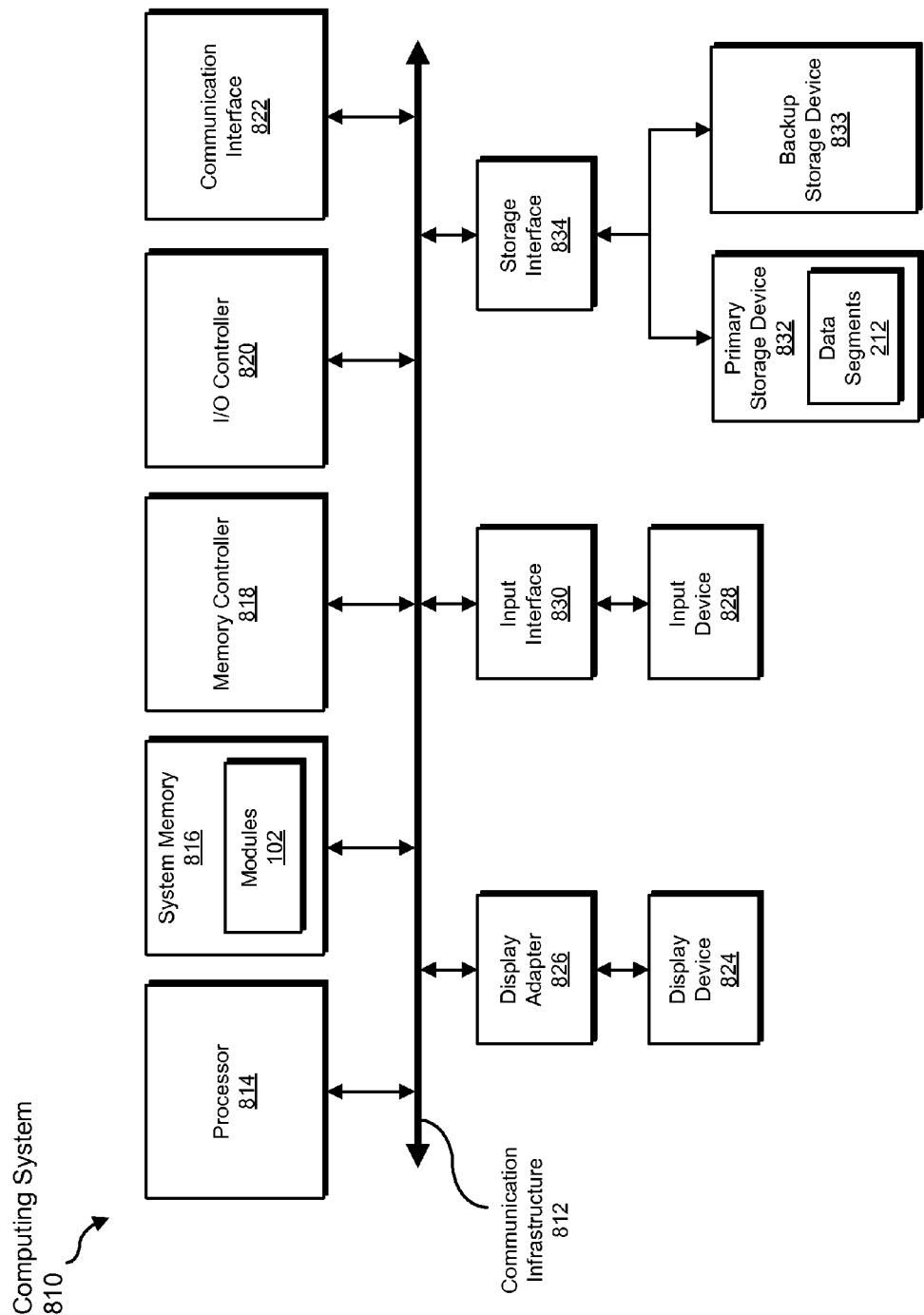
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data segments 212 from FIG. 2 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
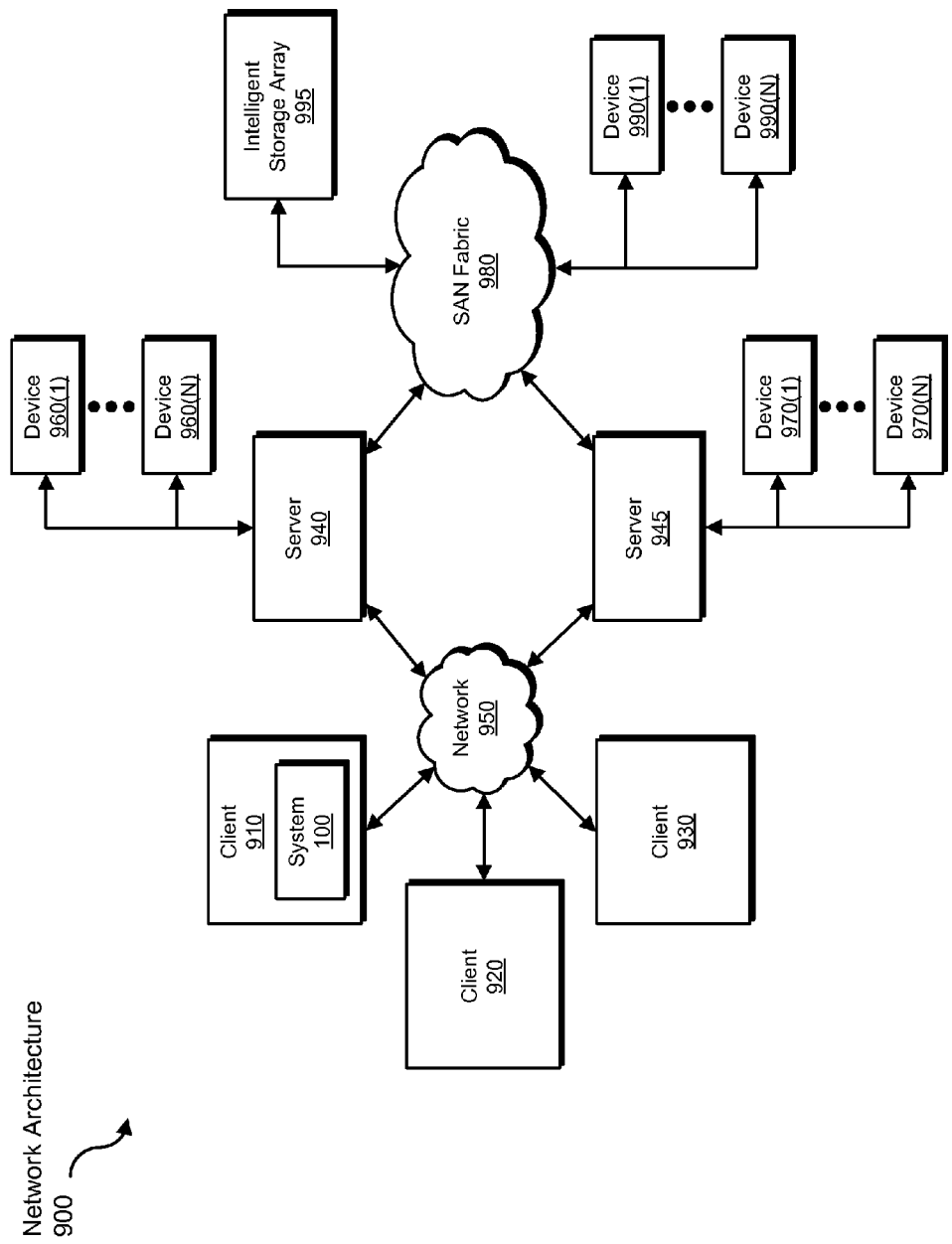
FIG. 9 is a block diagram of an exemplary network architecture capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and intelligent storage array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for managing references in deduplicating data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data objects to be transformed, transform the data objects into deduplicated data segments that may be referenced by a limited number of data objects, output a result of the transformation so that the deduplicated data segments may be available to be referenced within a deduplicating data system, use the result of the transformation to store the data objects within the deduplicating data system, and store the result of the transformation to the deduplicating data system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing references in deduplicating data systems, at least a portion of the method being performed by a computing device comprising at least one processor, the method comprising:
    identifying a first instance of a data segment stored within a deduplicating data system that reduces redundant data storage by storing at least two data objects such that each of the two data objects references the first instance of the data segment;
    identifying an additional data object to be stored by the deduplicating data system, wherein the additional data object comprises the data segment;
    determining that an age limit of the first instance of the data segment has been reached, wherein the age limit of the first instance of the data segment:
        limits the amount of time during which the first instance of the data segment is available to be referenced; and
        indicates an age of the first instance of the data segment after which the first instance of the data segment cannot be referenced by any additional data objects that are later stored to the deduplicating data system;
    preventing storage-space fragmentation within the deduplicating data system by storing, based at least in part on determining that the age limit of the first instance of the data segment has been reached, a second instance of the data segment within the deduplicating data system that is referenced by the additional data object while also retaining the first instance of the data segment within the deduplicating data system.

2. The computer-implemented method of claim 1, wherein:
    the first instance of the data segment is stored within a first container that is stored within the deduplicating data system;
    the first container also stores a plurality of additional data segments;
    the age limit of the first instance of the data segment comprises an age limit of the first container that indicates an age of the first container after which data segments stored within the first container cannot be referenced by any additional data objects that are later stored to the deduplicating data system;
    preventing storage-space fragmentation within the deduplicating data system by storing the second instance of the data segment within the deduplicating data system comprises storing the second instance of the data segment within a second container within the deduplicating data system that is separate and distinct from the first container.

3. The computer-implemented method of claim 1, wherein:
    the first instance of the data segment is stored within a first container that is stored within the deduplicating data system;
    the first container also stores a plurality of additional data segments;
    the age limit of the first instance of the data segment comprises an age limit of the first container that indicates an age of the first container after which the first container cannot be referenced by any additional data objects that are later stored to the deduplicating data system;

preventing storage-space fragmentation within the deduplicating data system by storing the second instance of the data segment within the deduplicating data system comprises storing the second instance of the data segment within a second container within the deduplicating data system that is separate and distinct from the first container.

4. The computer-implemented method of claim 1, wherein preventing storage-space fragmentation within the deduplicating data system by storing the second instance of the data segment within the deduplicating data system comprises storing the second instance of the data segment within a container within the deduplicating data system that is separate and distinct from the container within the deduplicating data system within which the first instance of the data segment is stored.

5. The computer-implemented method of claim 1, further comprising:
  determining whether any data objects within the deduplicating data system reference the first instance of the data segment;
  deleting the first instance of the data segment based at least in part on determining that no data objects within the deduplicating data system reference the first instance of the data segment.

6. The computer-implemented method of claim 1, further comprising:
  detecting that the first instance of the data segment has become corrupt;
  using the second instance of the data segment to repair the first instance of the data segment.

7. The computer-implemented method of claim 1, further comprising:
  detecting that the second instance of the data segment has become corrupt;
  using the first instance of the data segment to repair the second instance of the data segment.

8. A system for managing references in deduplicating data systems, the system comprising:
  an identifying module that identifies:
    a first instance of a data segment stored within a deduplicating data system that reduces redundant data storage by storing at least two data objects such that each of the two data objects references the first instance of the data segment;
    an additional data object to be stored by the deduplicating data system, wherein the additional data object comprises the data segment;
  a determining module that determines that an age limit of the first instance of the data segment has been reached, wherein the age limit of the first instance of the data segment:
    limits the amount of time during which the first instance of the data segment is available to be referenced; and
    indicates an age of the first instance of the data segment after which the first instance of the data segment cannot be referenced by any additional data objects that are later stored to the deduplicating data system;
  a storing module that prevents storage-space fragmentation within the deduplicating data system by storing, based at least in part on determining that the age limit of the first instance of the data segment has been reached, a second instance of the data segment within the deduplicating data system that is referenced by the additional data object while also retaining the first instance of the data segment within the deduplicating data system;
  at least one processor that executes the identifying module, the determining module, and the storing module.

9. The system of claim 8, wherein:
  the first instance of the data segment is stored within a first container that is stored within the deduplicating data system;
  the first container also stores a plurality of additional data segments;
  the age limit of the first instance of the data segment comprises an age limit of the first container that indicates an age of the first container after which data segments stored within the first container cannot be referenced by any additional data objects that are later stored to the deduplicating data system;
  the storing module stores the second instance of the data segment within the deduplicating data system by storing the second instance of the data segment within a second container within the deduplicating data system that is separate and distinct from the first container.

10. The system of claim 8, wherein:
  the first instance of the data segment is stored within a first container that is stored within the deduplicating data system;
  the first container also stores a plurality of additional data segments;
  the age limit of the first instance of the data segment comprises an age limit of the first container that indicates an age of the first container after which the first container cannot be referenced by any additional data objects that are later stored to the deduplicating data system;
  the storing module stores the second instance of the data segment within the deduplicating data system by storing the second instance of the data segment within a second container within the deduplicating data system that is separate and distinct from the first container.

11. The system of claim 8, wherein the storing module stores the second instance of the data segment within the deduplicating data system by storing the second instance of the data segment within a container within the deduplicating data system that is separate and distinct from the container within the deduplicating data system within which the first instance of the data segment is stored.

12. The system of claim 8, wherein the storing module further:
  determines whether any data objects within the deduplicating data system reference the first instance of the data segment;
  deletes the first instance of the data segment based at least in part on determining that no data objects within the deduplicating data system reference the first instance of the data segment.

13. The system of claim 8, further comprising a repairing module that:
  detects that the first instance of the data segment has become corrupt;
  uses the second instance of the data segment to repair the first instance of the data segment.

14. The system of claim 8, further comprising a repairing module that:
  detects that the second instance of the data segment has become corrupt;
  uses the first instance of the data segment to repair the second instance of the data segment.

15. A non-transitory computer-readable medium comprising one or more computer-executable instructions that, when executed by at least one processor of a computing device, cause the computing device to:
  identify a first instance of a data segment stored within a deduplicating data system that reduces redundant data storage by storing at least two data objects such that each of the two data objects references the first instance of the data segment;
  identify an additional data object to be stored by the deduplicating data system, wherein the additional data object comprises the data segment;
  determine that an age limit of the first instance of the data segment has been reached, wherein the age limit of the first instance of the data segment:
    limits the amount of time during which the first instance of the data segment is available to be referenced; and
    indicates an age of the first instance of the data segment after which the first instance of the data segment cannot be referenced by any additional data objects that are later stored to the deduplicating data system;
  prevent storage-space fragmentation within the deduplicating data system by causing the computing device to store, based at least in part on determining that the age limit of the first instance of the data segment has been reached, a second instance of the data segment within the deduplicating data system that is referenced by the additional data object while also retaining the first instance of the data segment within the deduplicating data system.

16. The non-transitory computer-readable medium of claim 15, wherein:
  the first instance of the data segment is stored within a first container that is stored within the deduplicating data system;
  the first container also stores a plurality of additional data segments;
  the age limit of the first instance of the data segment comprises an age limit of the first container that indicates an age of the first container after which data segments stored within the first container cannot be referenced by any additional data objects that are later stored to the deduplicating data system;
  the one or more computer-executable instructions cause the computing device to store the second instance of the data segment within the deduplicating data system by causing the computing device to store the second instance of the data segment within a second container within the deduplicating data system that is separate and distinct from the first container.

17. The non-transitory computer-readable medium of claim 15, wherein:
  the first instance of the data segment is stored within a first container that is stored within the deduplicating data system;
  the first container also stores a plurality of additional data segments;
  the age limit of the first instance of the data segment comprises an age limit of the first container that indicates an age of the first container after which the first container cannot be referenced by any additional data objects that are later stored to the deduplicating data system;
  the one or more computer-executable instructions cause the computing device to store the second instance of the data segment within the deduplicating data system by causing the computing device to store the second instance of the data segment within a second container within the deduplicating data system that is separate and distinct from the first container.

18. The non-transitory computer-readable medium of claim 15, wherein the one or more computer-executable instructions cause the computing device to store the second instance of the data segment within the deduplicating data system by causing the computing device to store the second instance of the data segment within a container within the deduplicating data system that is separate and distinct from the container within the deduplicating data system within which the first instance of the data segment is stored.

19. The non-transitory computer-readable medium of claim 15, wherein the one or more computer-executable instructions further cause the computing device to:
  determine whether any data objects within the deduplicating data system reference the first instance of the data segment;
  delete the first instance of the data segment based at least in part on determining that no data objects within the deduplicating data system reference the first instance of the data segment.

20. The non-transitory computer-readable medium of claim 15, wherein the one or more computer-executable instructions further cause the computing device to:
  detect that the first instance of the data segment has become corrupt;
  use the second instance of the data segment to repair the first instance of the data segment.

* * * * *